United States Patent [19]

Borden et al.

[11] Patent Number: 5,447,921
[45] Date of Patent: Sep. 5, 1995

[54] CATALYST SYSTEM FOR ADHERENT RIGID FOAM

[75] Inventors: Keith A. Borden; David S. Jensen, both of McCandless Township, Allegheny County, Pa.; Robert E. Anderson, Union, Ky.

[73] Assignee: Aristech Chemical Corporation, Pittsburgh, Pa.

[21] Appl. No.: 409,400

[22] Filed: Mar. 24, 1995

[51] Int. Cl.[6] .................. C08G 18/02; C08G 18/04; C08G 18/18

[52] U.S. Cl. ........................... 521/99; 521/128; 521/137; 521/163; 521/172; 521/173

[58] Field of Search ............... 521/99, 128, 137, 163, 521/172, 173

[56] References Cited

U.S. PATENT DOCUMENTS

| | | | |
|---|---|---|---|
| 2,955,058 | 10/1960 | Foster | 117/104 |
| 4,314,036 | 2/1982 | Throne et al. | 521/99 |
| 4,465,792 | 8/1984 | Carr et al. | 521/138 |
| 4,636,528 | 1/1987 | Kamens et al. | 521/95 |
| 4,804,775 | 2/1989 | Kamath et al. | 558/358 |
| 4,810,729 | 3/1989 | Davis et al. | 521/94 |
| 5,206,281 | 4/1993 | Furuta | 524/425 |
| 5,296,545 | 3/1994 | Heise | 525/28 |
| 5,344,852 | 9/1994 | Brooks et al. | 521/99 |

*Primary Examiner*—Morton Foelak
*Attorney, Agent, or Firm*—William L. Krayer

[57] ABSTRACT

A thermosetting unsaturated polyester-polyurethane hybrid foam resin composition is made without significant blistering by using a 2-component catalyst system—one which initiates at room temperature and one which initiates at a temperature of at least 75° C. and has a one-hour half-life temperature of at least 90° C.; the composition has a room temperature stability of at least thirty days.

2 Claims, No Drawings

CATALYST SYSTEM FOR ADHERENT RIGID FOAM

TECHNICAL FIELD

This invention relates to rigid foam materials such as are used to reinforce formed surfaces or sheets, i.e. for the reinforcement of thermoformed acrylic tub-shower enclosures, spas, and the like. In particular it relates to rigid foams made from co-reacted unsaturated polyesters and polyurethanes, sometimes called hybrid resins. The invention is an improvement in the catalyst system and polymerization technique which converts very high percentages of monomer, in turn improving adhesion and minimizing blistering.

BACKGROUND OF THE INVENTION

This invention is an improvement in hybrid resin foam compositions such are disclosed in Brooks et al U.S. Pat. No. 5,344,852, and in the catalyst systems useful therein. The entire specification and claims of Brooks et al U.S. Pat. No. 5,344,852 are incorporated herein by reference.

The Brooks et al U.S. Pat. No. 5,344,852 describes a water blown unsaturated polyester-polyurethane hybrid resin foam formed by contacting an "A side" polyfunctional isocyanate compound and a free radical initiator, and a "B side" composition having three components—(i) an ethylenically unsaturated monomer in which a more or less conventional polyester polyol is dissolved, (ii) a polyamine compound capable of reacting with the A side composition to form dispersed, small, urea domains, and (iii) about 25 to 150 equivalents of water based on 100 equivalents of active hydrogen in the B side (not including that in the water). Further requirements are that the active NCO groups of the isocyanate should be about ten to about fifty times the number of active NH groups in the amine compound, and the isocyanate index should be between 0.5 and 2.0.

We have found that, in practice, certain properties of the various compositions which can be made by following the recipes of the '852 patent are difficult to predict or control. In particular, blistering sometimes occurs at the interface of the rigid foam and the acrylic sheet to which it is to adhere, causing (in addition to an unsightly defect which is difficult to explain) weaknesses and occasional delamination.

We have determined that it is possible to establish an association of the blistering and delamination phenomena with zones of high residual monomer. As will be demonstrated below, the incidence of blistering and delamination are greatly reduced when the monomer is almost completely polymerized in accordance with our invention. The invention involves improvements in the catalyst system.

Prior to the present invention, free radical initiators such as benzoyl peroxide (which may be referred to also as dibenzoyl peroxide) have become well known as "room temperature" initiators for polyester systems including polyester-polyurethane hybrid systems. That is, they will begin initiating a polymerization reaction in a more or less conventional unsaturated polyester polymerization mix as soon as the initiator is contacted with the polyester at temperatures as low as room temperature. Among the other well known such initiators are methyl ethyl ketone peroxide, methyl isobutyl ketone peroxide, 2,4-pentanedione peroxide, di-t-butyl peroxide, dicumyl peroxide, dilauroyl peroxide, and cumyl hydroperoxide.

Certain other initiators are known to require temperatures higher than room temperature to initiate the reaction. Such known compounds include various peroxyesters, peroxycarbonates, and peroxyketals, in particular such compounds as t-butyl peroxypivalate, t-amyl peroxybenzoate, 2,5-dimethyl-2,5-di-(2-ethylhexanoylperoxy)hexane, t-amyl peroxy-2-ethylhexanoate, t-amyl peroxyacetate, t-butyl peroxy-3,5,5-trimethylhexanoate, t-butyl peroxy-2-ethylhexyl carbonate, t-butyl peroxy isopropyl carbonate, t-butyl peroxy-2-ethylhexanoate, di(4-t-butylcyclohexyl) peroxydicarbonate, 1,1-di-(t-butylperoxy)cyclohexane, and 1,1-di(t-butylperoxy)-3,5,5-trimethylcyclohexane.

We are not aware of the use of a combination of room temperature initiators with higher temperature initiators in the combination of polyesters and isocyanates which we use nor in such a combination to provide the advantages we outline herein.

SUMMARY OF THE INVENTION

We have invented a catalyst system useful for making an improved rigid polyester-polyurethane foam, and an unsaturated polyester-isocyanate composition incorporating the catalyst system, together with a method for making such a foam.

Our invention comprises an A side isocyanate which includes a room temperature initiator for a polyol/polyester/vinyl additive reaction and a high temperature initiator for a polyol/polyester/vinyl additive reaction, both in the amounts and according to the definitions described below, and a B side composition including a hydroxy-terminated polyester polyol, an ethylenically unsaturated monomer, an amine compound having two or more primary or secondary amine groups, water, a peroxide promoter or activator, a surfactant, a foam catalyst, and a urethane catalyst. The room temperature initiator may be any conventional or other initiator containing active oxygen and which will initiate the polyester/polyol/monomer polymerization reaction after contact with a promoter, and the high temperature initiator may be any initiator having a similar effect, a 1 hour half-life temperature of at least 90° C. and an active oxygen of at least 5 weight percent. In addition, the combination of catalysts in the A-side will be stable at 150° F. for at least 2 days. Of the room temperature initiators, we prefer benzoyl peroxide, and for the high temperature initiator, we prefer t-butyl peroxy isopropyl carbonate or t-butyl peroxy-3,5,5-trimethylhexanoate. These initiators, of course, are intended to act on the B side composition but, as in prior practice, they are mixed in the A side so they will not contact the B side until they are needed.

DETAILED DESCRIPTION OF THE INVENTION

For the purpose of this disclosure, the term "cure" or "curing" means the transformation of the hybrid resin foam composition from a liquid to a gel or solid state. The curing occurs by reaction of isocyanate with active hydrogen-containing compounds and a vinyl addition crosslinking reaction. The vinyl addition reaction occurs primarily between the ethylenically unsaturated monomer and the unsaturated polyester polyol. Depending on the catalysts employed, curing can optimally occur at the time of use at temperatures of about 25° C. to about 125° C. for a time of about 1 second to about 10 minutes and most preferably 10 seconds to about 1 minute.

The room temperature catalyst will begin curing when the promoter in the B side is contacted with the initiator from the A side, and the high temperature catalyst will begin its activation when the exotherm from the initial reaction raises the temperature of the mixture to about 75° C.

The isocyanate compound may be any of the variants described in the Brooks et al patent referenced above. The isocyanate compound must have at least two NCO functional groups per molecule and be capable of reacting with the amine compound and the polyester polyol. Examples of suitable polyisocyanate compounds include 4,4'-diphenylmethylene diisocyanate (MDI), polycarbodiimide-modified diphenylmethane diisocyanate, polymethylene polyphenylisocyanate (PMPPI), 2,4- and 2,6-toluenediisocyanate (TDI), naphthalene diisocyanate, metaphenylene diisocyanate, isophorone diisocyanate, hexamethylene diisocyanate, and mixtures thereof. Preferred isocyanates are aromatic and liquid at room temperature. Most preferred are polymeric MDI's and PMPPI's.

The free radical initiators (which are present in the A side) when mixed with the B side, act to enable network development via vinyl addition polymerization in producing the foam compositions of this invention. The multicomponent free radical initiator system includes at least one component such as benzoyl peroxide. The peroxide is dispersed in the A side at a level of about 0.1 parts per 100 parts polyester resin (phr) to about 5 phr, preferably between 1 phr and 3 phr. Typical peroxide promoters for room temperature activation include N,N-diethylaniline, N,N-dimethylaniline, N,N-dimethylacetoacetamide N,N-dimethyl-p-toluidine, cobalt octoate, and cobalt napthenate, with N,N-dimethyl-p-toluidine being preferred in this invention. The peroxide promoter is added to the B side at a level of about 0.05 phr to about 5 phr, preferably between about 0.1 phr and 0.3 phr.

In addition to room temperature activated peroxide-type compounds, the multicomponent free radical initiator system of this invention also includes at least one component that is solely activated by the heat of reaction from hybrid resin foam formation and which, when included with the room temperature catalyst into the A-side will have a shelf life of at least 30 days at room temperature (or at least 2 days at 150° F.). This component of the invention is added to the A side at a level of about 0.1 phr to about 5 phr, preferably between about 0.5 phr and 2 phr.

The B side composition comprises (i) an ethylenically unsaturated monomer having dissolved therein about 30–90 weight percent of a polyester polyol having at least one ethylenically unsaturated group per molecule which has predominantly hydroxyl end groups; (ii) an amine compound having two or more primary or secondary amine end groups in an amount effective to react with the A side composition to form small urea domains finely dispersed within a continuous unsaturated polyester-polyurethane hybrid phase; and (iii) about 25 to about 150 equivalents of water based on 100 equivalents of active hydrogen in the B side. Optionally, a foam catalyst, a silicone surfactant, a urethane catalyst and a filler can be added to the B side.

The ethylenically unsaturated monomers useful in the foam compositions of the invention can be any ethylenically unsaturated monomer capable of copolymerizing with the unsaturated polyester polyol to form a crosslinked polymer network. Examples of useful ethylenically unsaturated monomers are styrene, o-, m-, p-methyl styrene, methyl acrylate, methyl methacryate, t-butylstyrene, divinyl benzene, diallyl phthate, triallyl cyanurate and mixtures thereof. The preferred monomer is styrene because it provides an economical monomer solution.

The unsaturated polyester polyol has at least one ethylenically unsaturated group per molecule and predominantly hydroxyl end groups and preferably an acid number less than five. It is preferably an oligomer of an alpha, beta-ethylenically unsaturated dicarboxylic acid compound obtained by the condensation reaction of one or more of a saturated di- or polycarboxylic acid or anhydride with an excess of glycols or polyhydric alcohols. The unsaturated polyester polyol can also be prepared from unsaturated di- or polycarboxylic acid(s) or anhydride(s) with an excess of glycols and/or polyhydric alcohol(s). The polyols used in this invention preferably have an acid number less than five, and most preferably less than about two. Further, the polyols used in this invention have equivalent weights (100% solids basis) of between about 250 and about 1000, and preferably between about 250 and about 600. Examples of suitable saturated di- or polycarboxylic acids include isophthalic, orthophthalic, terephthalic, adipic, succinic, sebacic acid and mixtures thereof, with isophthalic acid being preferred. Typical unsaturated carboxylic acids or anhydrides include maleic acid, fumaric acid, citaconic acid, chloromaleic acid, allyl succinic acid, itaconic acid, mesaconic acid, their anhydrides and mixtures thereof, with maleic anhydride being the preferred choice. Examples of glycols and polyhydric alcohols which are useful in the invention include neopentyl glycol, ethylene glycol, diethylene glycol, triethylene glycol, propylene glycol, dipropylene glycol, 1,4-butanediol, polyethylene glycol, glycerol, mannitol, 1,propanediol, pentaerythritol, 1,6-hexanediol, 1,3-butanediol and mixtures thereof, with neopentyl glycol and ethylene glycol and mixtures thereof being preferred.

The amine compounds suitable for use in the invention are liquid at ambient temperature and soluble in the B side. The equivalent ratio of polyol to amine compound is about 99:1 to about 0:50, preferably about 95:5 to 80:20 and most preferably about 90:10. The preferred amine compounds are aromatic amines, especially diethyltoluenediamine. Other amine compounds, which are not normally soluble in the B side, may be dispersed in the B side using common solvents for amines. The solvent then acts as a carrier and aids in the dispersal of the amine compound in the B side.

In foam products, blowing agents are normally added to form gas bubbles in the polymerization mixture. The cellular foams of the present invention are "water blown" foams in which carbon dioxide formed by the reaction of water with isocyanate is the blowing agent. The water-isocyanate reaction is exothermic, and the heat produced from this reaction further aids expansion of the foam and the completion of polymerization of the hybrid resin.

The B side preferably contains a tertiary amine catalyst. The purpose of the tertiary amine catalyst is to activate the isocyanate group to nucleophilic substitution to promote the reaction with water to give carbon dioxide generation and with the polyhydroxyl compound to give urethane formation. Examples of tertiary amine catalysts include N,N-dimethylaminoethanol, tris(dimethyl aminopropyl) amine, N,N-dimethylcyclohexylamine, bis-(2-methyl aminoethyl) ether, N,N-dimethylbenzylamine, and diaminobicyclooctane. A preferred tertiary amine catalyst useful in this invention is tris(dimethyl aminopropyl) amine, sold under the tradename Polycat 9 by Air Products, Allentown, Pa.

Optionally, additional catalysts for the urethane reaction can be used. Mixtures of catalysts may be required to maintain a balance between the reaction of the isocyanate with the polyhydroxyl compound to form the urethane and the reaction of isocyanate with water. These catalysts are well-known to those skilled in the art. One preferred urethane catalyst useful in the invention is a dimethyltin dicarboxylate sold under the tradename Fomrez UL-28 by Witco Corp., New York, N.Y.

Additionally, a silicone surfactant may be used in the foam compositions of the invention. Surfactants are essential ingredients in the manufacture of most reactive foams. Surfactants, or mixtures thereof, aid in mixing incompatible components, controlling foam cell size and the degree of cell opening by reducing stress concentrations during rising, and preventing cell collapse. Silicone fluids are the preferred surfactants; however non-ionic, organic surfactants may also be used. A preferred silicone surfactant in the present invention is DC-197 available from Air Products, Allentown, Pa.

Chain extenders or curatives may also be used in the hybrid resin foam compositions of the invention. These include low molecular weight diols and polyols, such as ethylene glycol, hydroxyl-terminated polyethylene oxide (polyethylene glycol) and glycerin. One preferred chain extender useful in the present invention is ethylene glycol. Other common chain extenders which may be used in the invention include diamines and polyamines that, when blended with the B side and reacted with the A side, will not phase separate from the foam compositions. Examples of such amine compounds are ethylenediamine, polyoxypropylene diamine, dimethyldiaminodicyclohexylmethane, and 1,2-propanediamine. Such chain extenders provide several benefits to the foam compositions of the invention including reaction with the isocyanate to improve flexibility, impact resistance, reaction rate, and enhance self-skinning.

Optionally, fillers, fibers, catalysts, pigments, colorants, flame retardants, processing aids such as thixotropic agents and internal lubricants, all of which are well known to those skilled in the art, can be added to the foam compositions of the invention. Various organic or inorganic fillers or fibers can be added to reduce the exotherm of the reaction of the A and B sides, improve the reinforcing properties of the hybrid foam and/or reduce its cost. Fillers include such materials as talc, calcium carbonate, silica beads, calcium sulfate, aluminum trihydrate, ammonium polyphosphate, etc., with calcium carbonate and aluminum trihydrate and mixtures thereof being preferred in the invention. The amounts of filler or other additives will vary depending on the application.

The hybrid resin foam compositions of the invention can be fabricated using liquid reactive molding techniques commonly employed in the foam industry. Open molding comprises spraying the mixed foam composition onto a surface or substrate. This process is commonly termed "spray-up". Direct pour liquid molding comprises hand-mixing the A side with the B side and then pouring the hybrid liquid into or onto a mold wherein foam formation and curing occurs. The main differences between spraying-up and pouring are the mix time, mix intensity and fluid delivery pressure. In both techniques, the polyol and/or polyisocyanate can contain fibrous materials, fillers and/or other additives.

The preferred liquid foam system used in this invention has at least two liquid streams which feed into a mix head. In a two-stream system, the B side components are first mixed, then pumped into the mix head where the A side is introduced at the predetermined isocyanate index, at which time the foam is quickly delivered to a substrate, such as steel and coated steel products, wood, plastic, cardboard, acrylic sheets, gel or Teflon coats or other suitable solid substrate to which the foam compositions will adhere.

Preferably, the foam compositions of the invention have a density of about 1–10 lbs/ft$^3$ in the unfilled form. If a filler is used, the density will be greater, but the foam compositions of the invention can be advantageously applied to foams having up to about 50 percent filler at densities of up to about 35 lbs/ft$^3$ Also preferably, the compositions of the invention provide foams having a plurality of uniform, fine, closed cell structure. Most preferably, the foam compositions of the invention have a majority of closed cells, i.e., greater than about 50 percent and preferably greater than about 75 percent.

While applicants do not wish to be bound by any theory, it is believed that the multicomponent free radical initiator system, including the peroxide promoter, acts to thoroughly polymerize the unsaturated polyester and the ethylenically unsaturated monomer components of the hybrid resin foam before the foam solidifies. The crosslinking reactions of the unsaturated polyester and styrene monomer are initiated by the peroxide-type component after it is acted on by the peroxide promoter. Under ideal conditions, this sequence could lead to complete cure of the unsaturated constituents of the hybrid resin foam. Unfortunately, it is found that peroxide alone cannot achieve complete cure of the unsaturated constituents during the demonstrated reaction time. The free radical initiation from the peroxide is neither fast enough nor exothermic enough to allow for thorough polymerization of the unsaturated constituents. Once activated by the heat of reaction from the hybrid resin foam formation, the additional component or components of the free radical initiator system provide the needed faster, more exothermic cure. The multicomponent free radical initiator system is found to attain its peak exotherm much faster than a system using solitary peroxide-type compounds. With the free radical system of this invention, the hybrid resin foam quickly reaches the peak exotherm, thereby facilitating complete curing reactions with little residual monomer remaining.

Thermoplastic parts backed up with hybrid resin foam produced using only a peroxide-type initiator are unable to withstand exposure to temperatures of 180° F. without blistering. The hybrid resin foam of this type is found to have high levels of residual styrene monomer. Hybrid resin foam produced using the multicomponent free radical initiator system of this invention is found to have very low levels of residual styrene monomer. Thermoplastics parts backed up with hybrid resin foam made by the present invention, having low levels of residual styrene, successfully withstand exposure to 180° F. with no blistering.

Following are various data which illustrate the principles explained above.

In Table I, data are presented which show that the gel time and peak temperature achievable by dibenzoyl peroxide at room temperature is far superior to that achievable by a known "high temperature" initiator, 2,5-dimethyl-2,5-di-(2-ethylhexanoylperoxy) hexane, regardless of the type of activator (promoter) used.

TABLE I

Room Temperature Activated Catalyst Systems

| | gel time | peak temperature (°F.) | peak time |
|---|---|---|---|
| BPO @ 1.75% + 0.225% DMPT | 3:30 | 202 | 7:15 |
| BPO @ 3.5% + 0.225% DMPT | 2:30 | 218 | 5:30 |
| peroxyester @ 1.8% + 0.225% DMPT | >15:00 | 72 | — |
| peroxyester @ 1.8% + 0.3% cobalt octoate (Co) | >15:00 | 75 | — |
| peroxyester @ 1.8% + 0.3% potassium octoate (K) | >15:00 | 72 | — |
| peroxyester @ 1.8% + 0.3% Co + 0.4% K | >15:00 | 73 | — |
| peroxyester @ 1.8% + 0.3% vanadium octoate | >15:00 | 74 | — |
| BPO @ 1.75% + peroxyester @ 1.0% + 0.225% DMPT | 2:45 | 220 | 6:30 |

BPO = dibenzoyl peroxide paste (50% active)
peroxyester = 2,5-dimthyl-2,5-di-(2-ethylhexanoylperoxy)hexane
DMPT = N,N-dimethyl-p-toluidine
peak time = the elapsed time from catalyst addition to the attainment of peak temperature We are not aware of any activators which can be relied upon to reduce significantly the gel time and/or peak time of such high temperature initiators as the peroxyesters represented by 2,5-dimethyl-2,5-di-(2-ethylhexanoylperoxy) hexane, or to increase the peak temperature achievable in a practical time period.

We are concerned about stability of the catalyst system, and Table II is presented to illustrate the variation among catalysts in their ability to resist decomposition at relatively high temperatures. In Table II, the units in the first and second column are degrees Centigrade, and represent the temperatures at which the half-life of the catalyst is ten hours and one hour, respectively. By half-life, we mean the point in time (under the conditions of the test) at which half the catalyst composition is decomposed. Active oxygen is expressed as weight percent of the catalyst. The decomposition test is run on a dilute solution of catalyst (typically 0.2M) in aliphatic or aromatic hydrocarbons or chlorohydrocarbons.

Table II is assembled using manufacturer's data for catalyst half-life.

TABLE II

Catalyst Reactivity Data

| | 10 hr $t_{\frac{1}{2}}$(°C.) | 1 hr $t_{\frac{1}{2}}$(°C.) | active O (wt. %) |
|---|---|---|---|
| dibenzoyl peroxide paste | 73 | 91 | 3.36 |
| 2,5-dimethyl-2,5-di-(2-ethyl-hexanoylperoxy)hexane | 73 | 91 | 6.7 |
| t-amyl peroxy-2-ethylhexanoate | 75 | 92 | 5.21 |
| t-butyl peroxy-2-ethylhexanoate | 72 | 91 | 7.2 |
| t-butylperoxy isopropyl carbonate | 99 | 118 | 6.82 |
| t-butyl peroxy-3,5,5-trimethyl-hexanoate | 96 | 114 | 5.9 |

From Table III, it will be seen that the combination of 1.75% BPO and 1.0% TBP335TMH yields about the same active oxygen as 3.5% BPO alone.

TABLE III

Active Oxygen

| system | active O (g/100 g resin) |
|---|---|
| dibenzoyl peroxide paste (BPO) @ 2.0% | 0.0672 |
| BPO @ 1.75% + 2,5-dimethyl-2,5-di-(2-ethyl-hexanoylperoxy)hexane @ 1.0% | 0.1258 |
| BPO @ 1.75% + t-amyl peroxy-2-ethyl-hexanoate @ 1.0% | 0.1109 |
| BPO @ 1.75% + t-butylperoxy isopropyl carbonate @ 1.0% | 0.1270 |
| BPO @ 1.75% + t-butyl peroxy-3,5,5-trimethyl-hexanoate @ 1.0% | 0.1178 |
| BPO @ 3.5% | 0.1176 |

In Table IV, the effect of the high temperature catalyst on residual styrene in the complete rigid foam system is shown.

TABLE IV

Influence of catalyst type on residual styrene in hybrid foam

| co-catalyst system* | residual styrene (ppm) |
|---|---|
| control (no co-catalyst) | 35,000 |
| 2,5-dimethyl-2,5-di-(2-ethylhexanoylperoxy)hexane | 196 |
| t-butyl peroxy-3,5,5-trimethylhexanoate | 376 |
| t-butyl peroxy-3,5,5-trimethyl-hexanoate + 0.4% cobalt | 283 |
| t-butylperoxy isopropyl carbonate | 58 |
| t-butylperoxy isopropyl carbonate + 0.4% cobalt | 35 |

*catalyst system includes 1.75 phr dibenzoyl peroxide (as 50% paste) and 0.225 phr N,N-dimethyl-p-toluidine
co-catalysts listed in TABLE are at a concentration of 1.00 phr, cobalt is 12% solution of cobalt octoate
polyurethane-polyester hybrid foam is prepared according to recipe given in the Brooks patent.

In Table V, we present data which illustrate the importance of the combination of high- and low-temperature catalysts on stability of the system.

TABLE V

Stability of catalyzed A-side

| catalyst system* | 77° F. stability | 150° F. stability |
|---|---|---|
| 2,5-dimethyl-2,5-di-(2-ethyl-hexanoylperoxy)hexane | >30 days | 2 days |
| t-butyl peroxy-3,5,5-trimethylhexanoate | >30 days | 30 days |
| t-butylperoxy isopropyl carbonate | >30 days | 4 days |

A-side consists of polymeric MDI plus catalyst system
*catalyst system includes 1.75 phr dibenzoyl peroxide (as 50% paste)
Notes:
co-catalysts listed in TABLE are at a concentration of 1.00 phr
stability is monitored by viscosity increase
for this study a viscosity of 1000 cp is used as an arbitrary cutoff
phr = parts per hundred parts resin (from polyurethane-polyester recipe in Brooks patent)

We claim:
1. A water-blown, thermosetting, unsaturated polyester-polyurethane hybrid foam resin composition formed by contacting:
(a) an A side composition comprising a polyfunctional isocyanate compound, a peroxy compound capable of initiating free radical polymerization at room temperature on contact with a peroxide promoter, and a high temperature peroxy compound having a 1 hour half-life temperature of at least 90° C. and an active oxygen content of at least 5 weight percent, wherein the room temperature catalyst will begin curing when the promoter in the B side is contacted with the initiator from the A side, and the high temperature catalyst will begin its activation when the exotherm from the initial reaction raises the temperature of the mixture to about 75° C., and (b) a B side composition comprising a mixture of (i) an ethylenically unsaturated monomer having dissolved therein about 30–90 weight percent of a polyester polyol having at least one ethylenically unsaturated group per molecule which has predominantly hydroxyl end groups; (ii) an amine compound having two or more primary or secondary amine groups in an amount effective to react with the A side composition to form a first urea phase comprising small urea domains finely dispersed within a second polyester-polyurethane hybrid phase; and (iii) about 25 to abut 150 equivalents water based on 100 equivalents of active hydrogen in the B side, not including active hydrogen from water; said composition having a ratio of active NCO groups of the isocyanate to active NH groups of the amine compound of between about 10:1 and abut 50:1, and an isocyanate index, NCO:(NH+OH+COOH+HOH), of between about 0.5 and about 2.0, wherein said A side composition has a 150° F. stability of at least 2 days as measured by viscosity increase.

2. Composition of claim 1 wherein the peroxy compounds of said A side composition are benzoyl peroxide and t-butyl peroxy-3,5,5-trimethylhexanoate.

* * * * *

UNITED STATES PATENT AND TRADEMARK OFFICE
CERTIFICATE OF CORRECTION

PATENT NO. : 5,447,921

DATED : September 5, 1995

INVENTOR(S) : Keith A. Borden, David S. Jensen and Robert E. Anderson

It is certified that error appears in the above-identified patent and that said Letters Patent is hereby corrected as shown below:

In column 4, line 46, correct "0:50" to read "50:50".

In column 7, line 27 correct "dimtryl" to read "dimethyl".

In column 8, line 20 put "‡" after foam.

In column 8, line 33 before "polyurethane" put "‡".

Signed and Sealed this

Fifteenth Day of April, 1997

*Attest:*

BRUCE LEHMAN

*Attesting Officer*     *Commissioner of Patents and Trademarks*